INVENTOR.
Edward S. Bettis
Joseph H. Westsik
ATTORNEY.

May 28, 1968     E. S. BETTIS ETAL     3,385,759
FAST BURST NEUTRONIC REACTOR

Filed May 8, 1967     2 Sheets-Sheet 2

INVENTOR.
Edward S. Bettis
Joseph H. Westsik

ATTORNEY.

3,385,759
FAST BURST NEUTRONIC REACTOR
Edward S. Bettis, Knoxville, Tenn., and Joseph H. Westsik, Richland, Wash., assignors to the United States of America as represented by the United States Atomic Energy Commission
Filed May 8, 1967, Ser. No. 637,880
8 Claims. (Cl. 176—49)

ABSTRACT OF THE DISCLOSURE

A pulsed neutronic reactor incorporates a core arrangement wherein molten salt containing fissionable fuel floats on a liquid metal reservoir. The molten salt fuel is driven upward through a tubulation by raising the level of the liquid metal on which it floats. The molten salt fuel becomes supercritical as it passes upward through the tubulation, emits a short but intense burst of neutrons, and then becomes subcritical as it continues upward. Following the "burst," the molten salt fuel passes into an annular cooling cavity where liquid metal from the reservoir is discharged into the molten salt to cool it. The molten salt fuel is then returned to the region below the core which it occupied prior to its being driven into a supercritical configuration whereupon the above procedure is repeated and another "burst" obtained.

Background of the invention

The invention described herein relates generally to neutronic reactors and more particularly to a molten salt fueled fast burst reactor. It was made in the course of, or under, a contract with the U. S. Atomic Energy Commission.

For certain applications such as materials testing, an extremely high fast neutron flux is required for a very short time period. Pulsed, or fast burst type reactors, are ideally suited for such applications inasmuch as they produce high peak neutron fluxes of very short duration and are not limited by the heat-removal requirements of reactors designed to produce high neutron fluxes on a continuous basis. Because the burst of neutrons in a pulsed reactor is of such short duration, only a small amount of heat is generated which can be removed from the reactor during the interval between succeeding pulses.

Summary of the invention

In accordance with the invention, a molten salt fueled pulsed reactor is provided for generating short intense bursts of neutrons. The molten salt fuel floats on liquid metal coolant such as molten lead which is used to raise the molten salt fuel into an active core region surrounded by neutron reflector. The molten salt becomes supercritical within the active core region, emits a short intense burst of neutrons, and then returns to a subcritical condition. The molten salt fuel is then displaced from the active core region to a heat exchange region where it is cooled by direct contact with liquid metal coolant which is discharged into and passes downwardly through the molten salt fuel. The molten salt fuel is then returned to its initial position below the active core region in preparation for repeating the cycle and generating another burst of neutrons.

Description of the preferred embodiment

Figure 1:
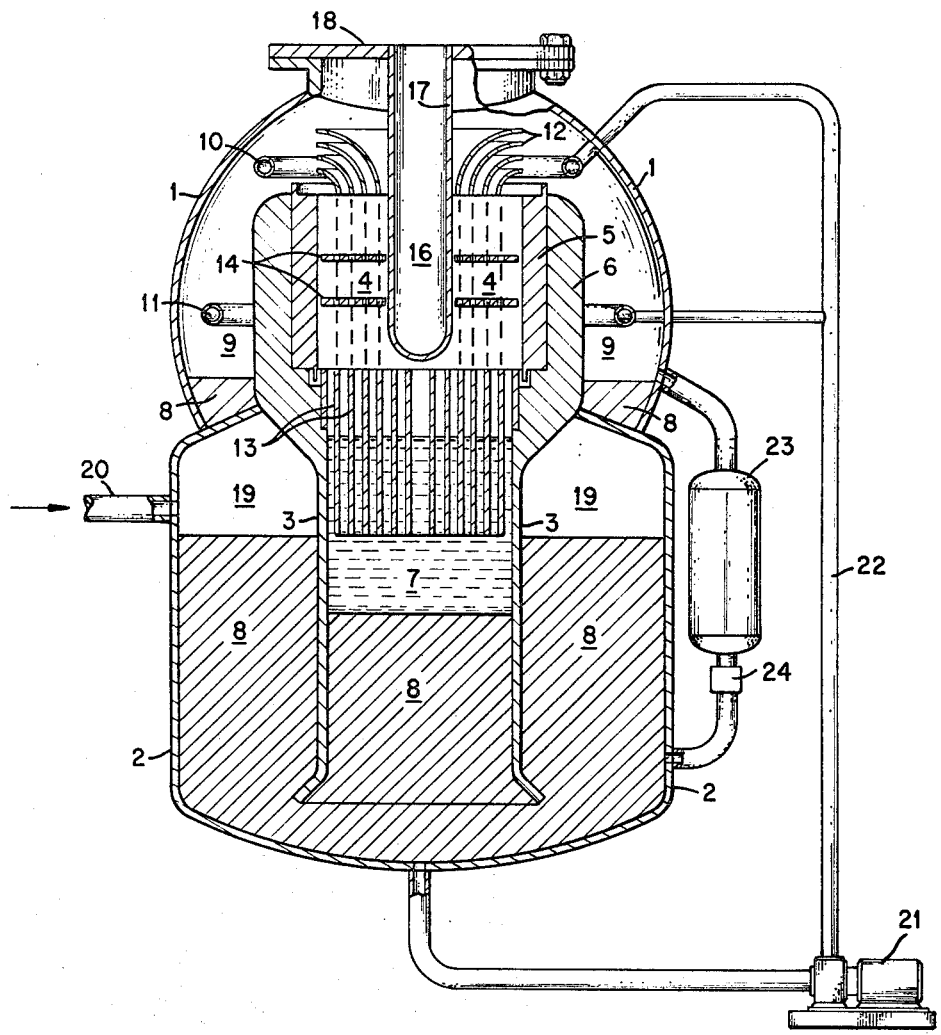
FIG. 1 shows schematically, in vertical section, a molten-salt-fueled pulsed reactor designed in accordance with the invention.

A pulsed reactor made in accordance with the invention is illustrated in vertical section in FIG. 1. As shown, the reactor containment vessel comprises an upper section 1 and a lower section 2 communicating through a centrally positioned tubulation 3. Upper section 1 provides containment for the active core region 4 of the reactor and a graphite reflector 5 and container-reflector 6 which enclose and define the outer boundary of active core region 4. Lower section 2 of the containment vessel serves principally as a reservoir between neutron bursts or pulses by the reactor for the storage of molten salt fuel 7 and liquid metal coolant 8. The molten salt fuel, being lighter than and immiscible with the liquid metal coolant, floats thereon. Molten salt fuel 7 preferably comprises a mixture of lithium fluoride and uranium tetrafluoride, and molten lead is preferred as liquid metal coolant 8. An annular heat exchange region 9 is defined by the radially outermost wall of container-reflector 6 and upper section 1 of the reactor containment vessel. Positioned within heat exchange region 9 are a pair of coolant spray discharge manifolds 10 and 11 for discharging a spray of molten lead into the molten salt fuel after it has passed through active core region 4 and overflowed into heat exchange region 9. A set of turning vanes 12 is disposed immediately above active core region 1 in order to deflect upwardly flowing molten salt fuel discharging from active core region 1 radially outward toward heat exchange region 9. Turning vanes 12 contain material having a high neutron absorption cross-section in order to more rapidly terminate the neutron chain-reaction occurring in the molten salt fuel as it discharges from the active core region 4. A second set of plates 13, containing material having a high neutron absorption cross-section, is positioned in the upper end of tubulation 3 immediately below active core region 4. Plates 13 prevent the premature development of a chain reaction in molten salt fuel 7 before it enters the active core region. Braces 14 are provided in active core region 4 to support a multiplicity of cups 15 which are described in greater detail in reference to FIG. 2 below.

Test materials to be exposed to neutron irradiation are disposed within test cavity 16 located centrally within active core region 4. Test cavity 16 is provided by a hollow tubular member 17 depending from flange 18 which provides a closure for upper section 1 of the reactor containment vessel.

In operation, a burst of neutrons is obtained by driving a mass of molten salt fuel 7 into active core region 4 within graphite reflector 5 and container-reflector 6. The molten salt fuel 7 floats on top of molten lead coolant 8 which is driven upward through tubulation 3 by means of a pulse of pressurized gas injected into region 19 through conduit 20. The pressurized gas pushes downward on the molten lead in the annular region between tubulation 3 and lower section 2 of the containment vessel, thereby forcing the molten lead and molten salt fuel floating thereon upward through tubulation 3 into active core region 4. When the molten salt fuel level raises to a position approximately three inches below the top of graphite reflector 5, the reactor becomes critical on prompt neutrons. As the remainder of the active core region fills, additional reactivity is introduced to drive the reactor into a super-critical condition where the neutron flux rapidly increases to provide the desired pulse or burst of neutrons for irradiating test materials within test cavity 16. As the chain reaction progresses, the temperature of the molten salt fuel increases rapidly causing the reactor to become sub-critical due to the negative temperature coefficient of reactivity of the molten salt fuel. The molten lead 8, driven by the pressurized gas pulse in region 19, continues to rise through the active core region causing the molten salt fuel 7 to overflow into heat exchange region 9. The entire transit time of the molten salt fuel through active core region 4 is about one-half second.

Heat generated in the molten salt fuel as a result of the fission chain reaction, which occurs as it passes through the active core region 4, is removed from the molten salt in heat exchange region 9. A pump 21, having its suction connected to the molten lead coolant 8 in lower section 2 of the reactor containment vessel, pumps relatively cool molten lead coolant through piping 22 to discharge manifolds 10 and 11 which discharge the lead into heat exchange region 9. The salt is thus cooled by direct contact with the lead coolant. The molten salt and lead reach thermal equilibrium rapidly and the heated lead flows through an air-cooled heat exchanger 23 when freeze valve 24 is opened. The flow from pump 21 is adjusted to equal the flow through freeze valve 24 thereby maintaining the level of molten lead coolant 8 in heat exchange region 9 at a constant level.

When the entire mass of molten salt fuel 7 has been cooled to the starting temperature of about 500° C., the freeze valve 24 is closed while pump 21 continues pumping lead into heat exchange region 9. The molten salt fuel floating on the molten lead in heat exchange region 9 is thus displaced upward so as to flow back over the reflector top, and then downward through active core region 4 to accumulate in tubulation 3 below active core region 4 where it floats on molten lead coolant 8. After the entire volume of molten salt fuel is returned to its initial position below active core region 4, pump 21 is de-energized and freeze valve 24 opened to permit excess molten lead in heat exchange region 9 to return to lower section 2 of the reactor containment vessel. The reactor is then ready for recycling through the above described steps to generate a new burst or pulse of neutrons.

Figure 2:
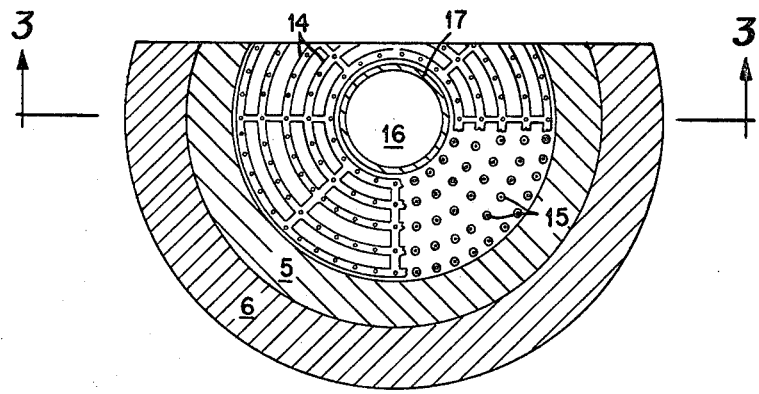
FIG. 2 is an enlarged horizontal section taken through the active core region of the reactor of FIG. 1.
Figure 3:
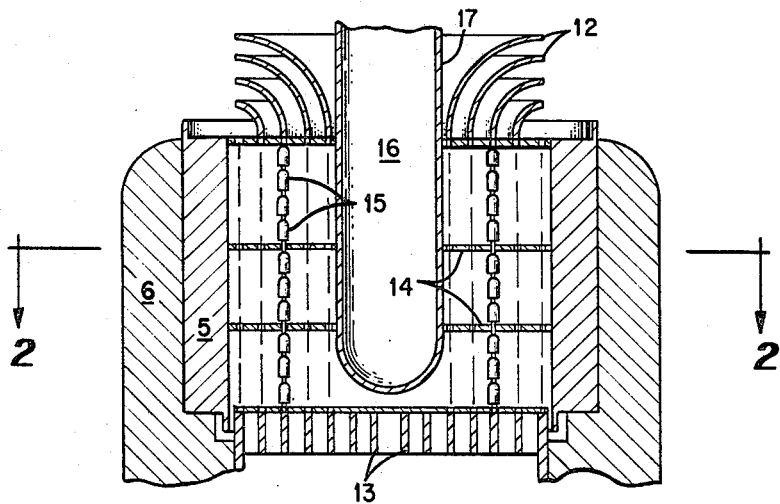
FIG. 3 is an enlarged vertical section of the active core region of the reactor of FIG. 1.

Referring now to FIGS. 2 and 3, eleven tiers of inverted cups 15 are supported by braces 14 within active core region 4. The inverted cups hold a total of about one cubic foot of molten salt fuel when completely filled. The cups serve the purpose of retaining a portion of the expanding molten salt fuel and preventing its leaving the active core region 4 during the neutron chain reaction so as to partially compensate for the very large negative temperature coefficient of reactivity of the fuel. Cups 15 may be filled to a variable degree by maintaining the reactor under a vacuum before the molten salt fuel is raised into the active core region. If the reactor is at atmospheric pressure when the active core region fills with molten salt, only about one-tenth cubic foot of molten salt will be retained in the cups prior to the neutron burst so that in effect a multiplicity of voids are created within the active core region. The higher pressure created during the burst causes the molten salt to enter the cups reducing the size of the voids therein and causing a positive reactivity insertion to occur due to the negative void coefficient of reactivity of the reactor. The negative void coefficient of reactivity thus partially compensates for the large negative temperature coefficient of reactivity. By proper selection of the number and size of inverted cups 15 and the pressure within the reactor prior to a burst, the negative temperature coefficient which is operative on the burst may be regulated to achieve the desired burst size.

Technical specifications for a pulsed reactor made according to the invention substantially as shown in the drawings are listed in the table below.

TABLE

| | |
|---|---|
| Fuel salt composition | 73 LiF-27UF$_4$ (mole percent). |
| Melting temperature of fuel salt | 490° C. |
| Fuel salt volume | 14 ft.$^3$. |
| Coolant | Lead. |
| Coolant volume | 190 ft.$^3$. |
| Operating temperature range | 500° C. to 1500° C. |
| Permissible cycles or pulses per hour | 2. |
| Burst yield (mw. sec.) | 1300. |
| Burst yield (neutrons) | $10^{20}$. |
| Burst width or duration | <1 millisecond. |
| Core diameter | 33 in. |
| Material of construction | INOR-8 (coated with Cb where contact with molten salt fuel occurs). |

The above description of the invention was offered for illustrative purposes only, and should not be interpreted in a limiting sense. It is intended rather that the invention be limited only by the claims appended hereto.

What is claimed is:

1. A pulsed neutronic reactor for producing bursts of fast neutrons comprising:
   (a) a reservoir of liquid metal;
   (b) a vertically oriented tubulation having an upper end and a lower end, said lower end being immersed in said reservoir of liquid metal;
   (c) a mass of fissionable-fuel-bearing molten salt disposed initially within said tubulation and floating on said liquid metal;
   (d) neutron reflection means surrounding a portion of said tubulation adjacent its upper end;
   (e) means for raising the level of said liquid metal within said tubulation so as to drive said mass of molten salt upward through said tubulation, said mass of molten salt becoming super-critical as it passes upward through said portion of said tubulation surrounded by said neutron reflection means;
   (f) container means surrounding said tubulation and neutron reflection means, said container means and neutron reflection means defining a cavity for holding said molten salt fuel in a subcritical configuration after it passes through and discharges from said upper end of said tubulation;
   (g) means for passing liquid metal from said reservoir through said molten salt to cool said molten salt; and
   (h) means for removing heat from said liquid metal.

2. The neutronic reactor of claim 1 wherein a set of turning vanes is disposed above said upper end of said tubulation for deflecting said molten salt into said cavity as it discharges from said tubulation.

3. The neutronic reactor of claim 2 wherein said turning vanes contain material having a high neutron absorption cross-section.

4. The neutronic reactor of claim 1 wherein said liquid metal is lead.

5. The neutronic reactor of claim 1 wherein said fissionable-fuel-bearing molten salt is composed of a mixture of lithium fluoride and uranium tetrafluoride.

6. The neutronic reactor of claim 1 wherein compressed gas is used to raise the level of said liquid metal within said tubulation.

7. The neutronic reactor of claim 1 wherein a multiplicity of inverted cups are disposed within said portion of said tubulation surrounded by said neutron reflection means, said cups providing voids within said molten salt fuel to partially compensate for the negative temperature coefficient of said fuel.

8. The neutronic reactor of claim 1 wherein a test cavity is provided centrally within said portion of said tubulation surrounded by said neutron reflection means.

References Cited

UNITED STATES PATENTS 3,262,856    7/1966    Bettis _____ 176—49

FOREIGN PATENTS 551,797    1/1958    Canada.

OTHER REFERENCES

Nuclear Science and Engineering, vol. 2, 1957, pp. 797–803.

CARL D. QUARFORTH, *Primary Examiner.*

H. E. BEHREND, *Assistant Examiner.*